United States Patent [19]

Lewis et al.

[11] 4,143,707
[45] Mar. 13, 1979

[54] AIR CONDITIONING APPARATUS INCLUDING A HEAT PUMP

[75] Inventors: Carl M. Lewis, Onalaska; Peter D. Ferguson, La Crosse, both of Wis.

[73] Assignee: The Trane Company, La Crosse, Wis.

[21] Appl. No.: 853,361

[22] Filed: Nov. 21, 1977

[51] Int. Cl.² ............................................. F25B 13/00
[52] U.S. Cl. ........................................ 165/28; 62/160; 165/29
[58] Field of Search .................... 165/29, 28; 62/160, 62/324; 236/91 D

[56] References Cited

U.S. PATENT DOCUMENTS

| 3,373,800 | 3/1968 | Ferdelman | 165/29 |
| 3,537,509 | 11/1970 | Ferdelman | 165/29 |
| 3,996,998 | 12/1976 | Garst et al. | 165/12 |

*Primary Examiner*—William E. Wayner
*Attorney, Agent, or Firm*—Peter D. Ferguson; Carl M. Lewis

[57] ABSTRACT

Apparatus are disclosed for conditioning the air within an indoor space and include first heat transfer means for selectively heating air passing to the space and a heat pump selectively operable in a heating mode, also for heating air passing to the indoor space. Control means are provided for effecting operation of the first heat transfer means and the heat pump which include means for sensing the demand for heat within the indoor space and for distinguishing between a relatively low demand and a relatively high demand. Operation of the heat pump is effected in response to a relatively low demand for heat until such demand is satisfied. In the event that a relatively high demand for heat is sensed, operation of the heat pump is terminated and the first heat transfer means is operated until such time as both the relatively high and low demands for heat are satisfied. In the event that outdoor ambient temperature drops below a predetermined level, means are provided for preventing operation of the heat pump and for effecting operation of the first heat transfer means in response to the relatively low demand for heat.

2 Claims, 2 Drawing Figures

AIR CONDITIONING APPARATUS INCLUDING A HEAT PUMP

BACKGROUND OF THE INVENTION

1. Field of the Invention

The present invention relates generally to apparatus for conditioning the air within an indoor space and, more specifically, for heating the air within an indoor space utilizing one or the other of two selectively operable sources of heat. Many residential dwellings and light commercial structures in the United States today utilize a forced air-type heating system wherein air is circulated through a furnace to be heated and thereafter discharged to the indoor space. Typically, furnaces of this type utilize a fossil fuel such as oil or natural gas which, through combustion within a heat exchanger, transfer heat to the air; in some instances, however, electrical resistance heating elements are utilized as the heat source in this type of furnace. It is well known that the supplying of heat to residential dwellings and the like represents a large percentage of the total energy consumed today in the United States, which has led to increasing emphasis on energy conserving steps which may be taken with respect to such dwellings, such as improved insulation, setback type thermostats, the government-recommended reduced indoor temperature settings during the heating season.

In structures of the type under consideration, it is also common that means are provided to effect cooling of the air circulating to the indoor space by a refrigeration unit of the vapor-compression type. Such an installation generally entails the provision of an indoor heat exchange coil disposed within the plenum of the existing furnace over which air is circulated and cooled during the cooling season.

It is further known in the art that a vapor compression refrigeration system may be reversed in order to provide heat to an indoor space through the provision of a reversing valve within the refrigeration system and associated controls therefor, such a unit being commonly referred to as a heat pump. The heat pump, although operated by electricity, has definite operating advantages over resistance-type electric heat in terms of energy efficiency, and, during certain times of the year exhibits an operating efficiency which makes its cost of operation competitive with that of a fuel-fired heat exchanger utilizing natural gas or oil. Accordingly, certain operating advantages may be derived through the provision of a heating system wherein both a selectively operable heat pump and another selectively operable heat source are provided, along with suitable control means such that the heat pump is operated at those times when it is advantageous to do so. In practice, the present invention has application not only in new construction but also may be retrofitted to existing installations wherein a furnace of the forced-air type already exists. In many cases, the heat pump may replace an existing central air conditioning unit or, the building owner may simply choose to install a heat pump in order to achieve not only improved heating efficiencies, but also to obtain the benefits of air cooling and dehumidifcation during the summer.

2. Description of the Prior Art

A prior art system of the type under consideration is disclosed in U.S. Pat. No. 3,996,998 to Garst et al. In this system, a furnace is provided having first heat transfer means such as a fuel-fired or electric heat exchanger. Located within ductwork downstream from the furnace is the indoor coil of a selectively operable heat pump. Control means are provided for selectively operating either the first heat transfer means or the heat pump in order to supply heat to an indoor space. The control means disclosed include an indoor thermostat having a first set of contacts which close in response to a relatively low demand for heat, and a second set of contacts which close in response to a relatively high demand for heat. The heat pump is operated in response to closing of said first contacts, and, upon closing of the second contacts, operation of the heat pump is terminated and the first heat transfer means is caused to operate. Once the relatively high demand for heat is satisfied, operation of the first heat transfer means is terminated and the heat pump is once again operated until such time as the relatively low demand for heat is satisfied. Time delay means are provided for preventing re-energization of the heat pump immediately following termination of operation of the first heat transfer means in order to prevent excessive refrigerant pressures within the indoor coil of the heat pump.

SUMMARY OF THE INVENTION, OBJECTS

The present invention comprises apparatus for conditioning the air within an indoor space and includes a housing having a first heat transfer means disposed therein for selectively heating air which passes therethrough and further includes suitable duct means for providing communication between the housing and the indoor space, and indoor fan means such that air may be circulated through the housing and duct means thereto. In practice, the said housing may comprise a conventional forced air-type furnace having a fuel-fired heat exchanger or, in the alternative, resistance-type electric heating elements.

A selectively operable heat pump is also provided and includes a compressor, indoor heat exchanger coil, expansion means, outdoor heat exchange coil, and suitable conduit means for connecting same in a closed refrigerant circuit such that the indoor heat exchange coil may operate as a condenser to remove heat from compressed refrigerant and the outdoor heat exchange coil may operate as an evaporator to transfer heat to expanded refrigerant. The aforesaid indoor heat exchange coil is disposed within either the housing or the duct means in heat exchange relationship with the circulated air. In a preferred embodiment, the indoor heat exchange coil is disposed immediately downstream from the first heat transfer means. Thus, both the heat pump or the first heat transfer means are able to transfer heat to the air circulated through the housing and duct means to the indoor space.

In order to selectively operate the first heat transfer means and the heat pump, control means are provided which include means for sensing the demand for heat within the indoor space and for producing a first signal in response to a relatively low demand for heat and a second signal in response to satisfaction of said relatively low demand; and for producing a third signal in response to a relatively high demand for heat. First means are provided for initiating operation of the heat pump in its heating mode in response to said first signal and for terminating operation thereof in response to the second signal. Second means are provided for initiating operation of the first heat transfer means for terminating operation of the heat pump in response to said third signal, and for terminating operation of said first heat transfer means in response to said second signal.

Since it is undesirable that the heat pump operate when the outdoor ambient temperature decreases below a predetermined value, means are provided for sensing outdoor ambient temperature and for producing an override signal when said temperature drops below said predetermined value. Fourth means are provided responsive to said override signal for preventing operation of the heat pump and fifth means are provided, also response to said override signal for effecting operation of the first heat transfer means in response to said first signal and for terminating operation thereof in response to said second signal. Other controls provided include an outdoor temperature sensor and means responsive thereto for preventing operation of the first heat transfer means unless outdoor ambient temperature is below a predetermined minimum "balance point" temperature. In order to provide a smooth transition between heat pump operation and furnace operation, a plenum temperature sensor is disposed within the housing or duct means at a point immediately upstream from the indoor heat exchange coil. Means are provided responsive to said plenum temperature sensor for termination operation of the heat pump at such time as the first heat transfer means has achieved an operating temperature such that a predetermined minimum air temperature is produced.

Accordingly, it is an object of the present invention to provide a control system for air conditioning apparatus which include both first heat transfer means and a heat pump in order to efficiently and economically provide for selective operation thereof.

It is a further object of the present invention to provide such a control system wherein, upon occurrence of a relatively low demand for heat within an indoor space, operation of the heat pump is effected until such demand is satisfied; and, upon occurrence of a relatively high demand for heat within the indoor space, operation of the heat pump is terminated and operation of the first heat transfer means is effected until such time as both the relatively high demand and the relatively low demand are satisfied.

Another object of the present invention is the provision of such a control system wherein, at outdoor ambient temperatures below a predetermined minimum, operation of the heat pump is prevented and operation of the first heat transfer means is effected in response to a relatively low demand for heat within the indoor space until such time as the relatively low demand is satisfied.

These and further objects of the invention will become apparent from the following description of a preferred embodiment and by reference to the accompanying drawings.

DESCRIPTION OF A PREFERRED EMBODIMENT

Figure 1:
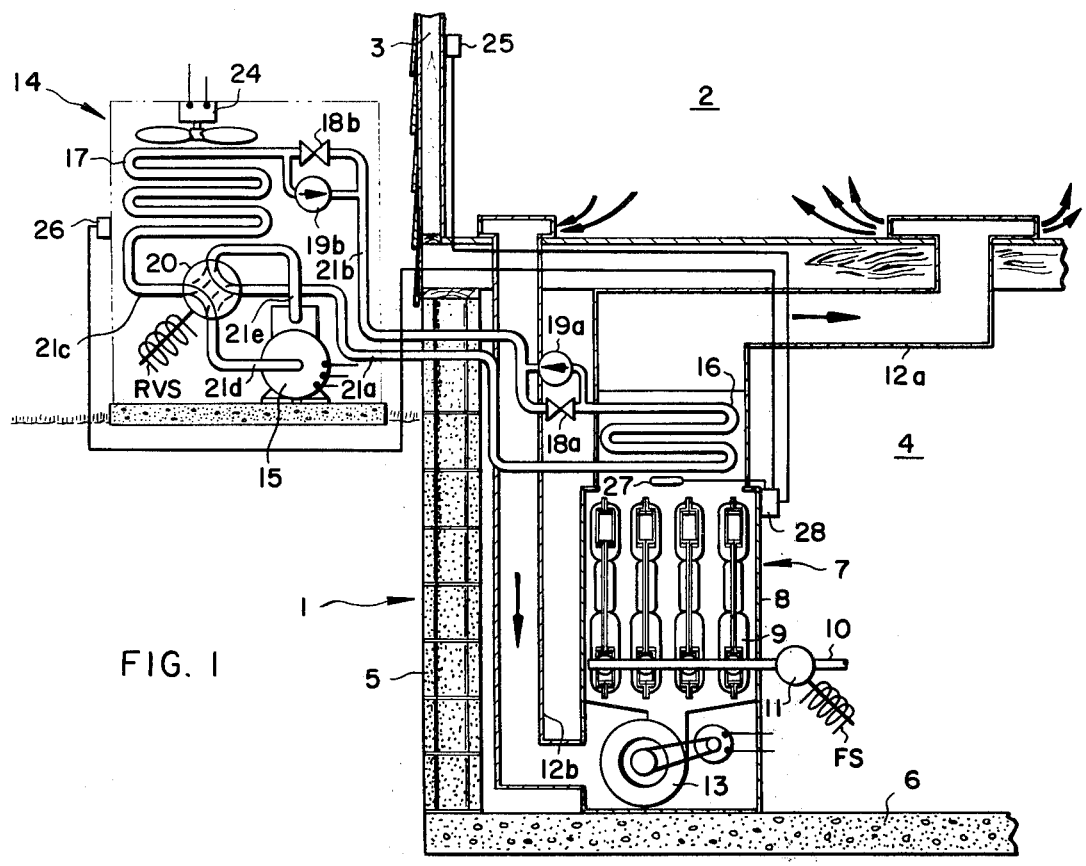
FIG. 1 is a partial cross-sectional view of a structure having an indoor space and illustrating in schematic the air conditioning apparatus of the present invention.

Turning now to FIG. 1 of the drawings, a portion of a structure, such as a residential dwelling, is illustrated in partial cross-section. As shown, the structure indicated generally by the reference numeral 1 includes an indoor space 2 which is insulated from ambient surroundings by an upright wall 3. Disposed beneath indoor space 2 is a lower or basement portion 4 of the structure having an outside wall 5 and a lower floor 6, as is conventional.

Disposed within basement portion 4 of the structure is apparatus for conditioning the air within indoor space 2 which comprise a housing 8 having disposed therein first heat transfer means 9. In practice, housing 8 may be a conventional forced air-type furnace and first heat transfer means 9 may comprise a conventional fuel-fired heat exchanger, such as one utilizing natural gas, propane, or oil; or in the alternative, may comprise resistance-type electrical heating means. In the embodiment illustrated in FIG. 1, first heat transfer means 9 is shown to be a fuel-fired heat exchanger which is supplied by fuel from conduit 10 under the control of a conventional solenoid-operated fuel valve 11, as will be discussed hereinafter.

Duct means 12a are connected to housing 8 in order to provide communication between said housing and indoor space 2, thus permitting the circulation of conditioned air under the influence of indoor fan means 13 through housing 8 in heat exchange relationship with first heat transfer means 9 to indoor space 2. Also illustrated in FIG. 1 are duct means 12b which serve to return air from indoor space 2 to the inlet portion of indoor fan means 13.

Disposed outside of structure 1, in outdoor ambient surroundings, is the outdoor section of a heat pump indicated generally by reference numeral 14. The heat pump includes a compressor 15, indoor heat exchange coil 16, expansion means 18a and 18b, outdoor heat exchange coil 17, and conduit means 21a through e for connecting the aforesaid elements in a closed refrigerant circuit. A reversing valve 20 is provided such that refrigerant flow within the heat pump circuit may be selectively reversed whereby the heat pump is operable in either a heating mode or a cooling mode, as will be described in detail below.

As illustrated in FIG. 1, reversing value 20 is in a position which will enable operation of the heat pump in its heating mode such that hot gas discharged from compressor 15 passes via conduit means 21e, a to indoor heat exchange coil 16, which is disposed in heat exchange relationship with air being circulated to indoor space 2. In practice, indoor heat exchange coil 16 may be disposed either within housing 8 itself or within a portion of duct means 12a, b. The relatively hot, compressed refrigerant is condensed within indoor heat exchange coil 16, thereby heating the circulated air passing thereover, and thereafter passes by way of check valve 19a to expansion means 18b disposed immediately adjacent outdoor heat exchange coil 17. After the condensed refrigerant is expanded into outdoor heat exchange coil 17, it is vaporized through heat exchange with ambient air which is forced over outdoor heat exchange coil 17 by means of an outdoor fan 24. Refrigerant thus vaporized exits outdoor heat exchange coil 17 via conduit means 21c and passes through reversing valve 20 and conduit means 21d to the suction inlet of compressor 15.

As will be apparent to those skilled in the art, the position of reversing valve 20 may be changed to the position illustrated in dotted lines in FIG. 1 in order that the heat pump may operate in a cooling mode. In this mode, refrigerant gas discharged from compressor 15 will be condensed in outdoor heat exchange coil 17, pass via check valve 19b and conduit means 21b through expansion means 18a, and into indoor heat exchange coil 16 where the condensed refrigerant will evaporate in order to extract heat from air passing thereover and thus provide a cooling effect for indoor space 2. The thus vaporized refrigerant then returns to the suction of compressor 15 by way of conduit means 21a, reversing valve 20, and conduit means 21d. As is conventional, reversing valve 20 is under the control of a solenoid RVS in order to provide for automatic changeover between the heating and cooling modes of the heat pump.

Figure 2:
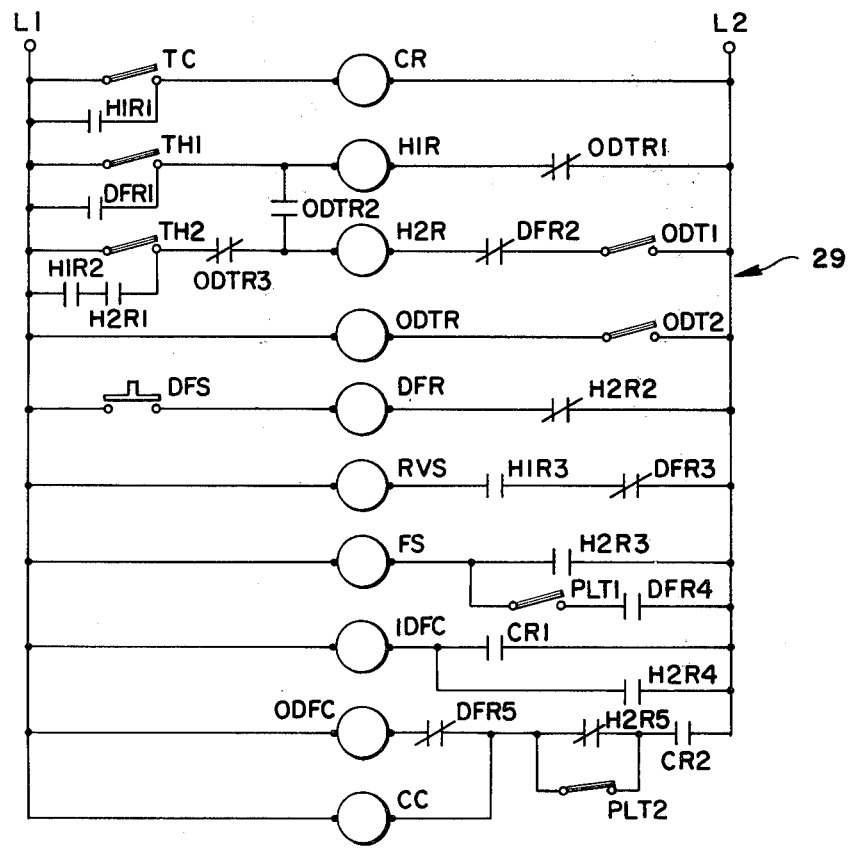
FIG. 2 is a schematic circuit diagram of a control system for use with the apparatus as illustrated in FIG. 1.

In order to provide for automatic control of first heat transfer means 9 and heat pump 14 in response to the demand for heating or cooling within indoor space 2, a control circuit is provided as illustrated in FIG. 2 and indicated generally by the reference numeral 29. Control circuit 29 includes a plurality of electro-mechanical relays which include a cooling relay CR, a first stage heating relay H1R, a second stage heating relay H2R, an outdoor temperature relay OTDR, and a defrost relay DFR. Also illustrated in the control circuit of FIG. 2 are solenoids RVS and FS for actuation of reversing valve 20 and fuel valve 11, respectively. In order to provide for the energization of indoor fan means 13, outdoor fan 24, and compressor 15, control circuit 29 includes respective contactors IDFC, ODFC, and CC, which, when energized, connect the respective components to a source of electrical current (not shown).

In order to sense the demand for heating or cooling within indoor space 2, means 25 are provided in the form of a suitable thermostat having a plurality of temperature responsive contacts which include cooling contacts TC, first stage heating contacts TH1, and second stage heating contacts TH2. In practice, these contacts may be actuated by a single temperature responsive bi-metal-type sensor disposed within indoor space 2, or, in the alternative, may comprise a commercially available solid-state type thermostat. In operation, contacts TC close in response to a demand for cooling within indoor space 2 as indicated by an increase in temperature therein above a desired set point, such as 76° F. Contacts TH1 close in response to a relatively low demand for heat within indoor space 2, as indicated by a decrease in the temperature within indoor space 2 below a first set point, such as 72° F. Upon an increased, relatively high demand for heat within indoor space 2, as indicated by a drop in the temperature therein below a second set point, such as 68° F., second stage heating contacts TH2 will close.

Means 26 are provided for sensing the temperature of the outdoor ambient and include a first set of contacts ODT1 which close when outdoor ambient temperature drops below the "balance point", that is, below the temperature at which the heat pump alone is capable of supplying the total heating needs of structure 1. In practice, the balance point would be adjustable in order to accommodate specific conditions encountered and results desired within a given installation. A typical balance point setting might be on the order of 35°-45° F. The means for sensing outdoor ambient temperature also include a second set of contacts ODT2 which are adjusted to close at a temperature below that at which it is desirable or practical to operate the heat pump. In practice, this temperature may be on the order of 0 to 15° F.

Means 27 are provided for sensing the temperature of air being circulated immediately upstream of indoor heat exchange coil 16 and include two sets of temperature responsive contacts PLT1 and PLT2. Contacts PLT1 are adjusted so as to open at temperatures around 135° F. and to close at a temperature around 95° F., for reasons which will become apparent hereinafter. Contacts PLT2 are adjusted to open at temperatures above about 95° F., for reasons which will likewise become apparent hereinafter.

OPERATION

Turning now to a discussion of the operation of control circuit 29, it will be assumed that outdoor ambient temperature is below the "balance point", resulting in closure of contacts ODT1; and that outdoor ambient temperature is above that at which contacts ODT2 close.

Assuming now that a relatively low demand for heat exists within indoor space 2, temperature responsive first stage heating contacts TH1 will close to produce a first signal. First means responsive to said first signal initiate operation of the heat pump in its heating mode and include first stage heating relay H1R which is energized and closes its normally open contacts H1R1 in order to provide energization of cooling relay CR. Cooling relay CR, in turn, closes its normally open contacts CR1 in order to energize indoor fan contactor IDFC, and its normally open contacts CR2 in order to energize outdoor fan contactor ODFC and compressor contactor CC, thereby initiating operation of the heat pump in its heating mode. Normally open contacts H1R3 are likewise closed in order to energize reversing valve solenoid RVS and place reversing valve 20 in its heating mode position as illustrated in FIG. 1. Assuming that the heat pump alone is capable of satisfying the relatively low demand for heat, contacts TH1 will subsequently open, producing a second signal in order to terminate operation of the heat pump.

If the heat pump is unable to satisfy the relatively low heating demand, such that the temperature within indoor space 2 continues to fall, thus indicating a relatively high demand for heat, or if a relatively high demand for heat exists initially due to other factors, contacts TH2 will close in order to produce a third signal. Second means are provided which respond to said third signal in order to terminate operation of the heat pump and initiate operation of the first heat transfer means, and to subsequently terminate operation of the first heat transfer means in response to the second signal produced upon opening of contacts TH1, as described hereafter.

Since it has been assumed that outdoor thermostat contacts ODT1 are closed, closure of contacts TH2 will result in energization of second stage heating relay H2R. Energization of relay H2R results in closure of its normally open contacts H2R3 in order to energize fuel valve solenoid FS and thus initiate operation of the first heat transfer means, while the opening of normally closed contacts H2R5 effects termination of operation of the outdoor fan and the heat pump compressor. It may be noted at this time that, even though contacts H2R5 open, contacts PLT2 will remain closed until such time as the temperature of the circulating air immediately upstream from indoor heat exchange coil 16 has reached a predetermined minimum, thereby providing a smooth transition between heat pump operation and operation of the first heat transfer means 9.

Looking now at second stage heating contacts TH2, it may be seen that, connected in parallel therewith, are normally open contacts H1R2 and H2R1. Since contacts H1R2 will be closed upon energization of first stage heating relay H1R in response to closure of contacts TH1, and since normally open contacts H2R1 will be closed in response to energization of second stage heating relay H2R in response closure of contacts TH2, it is seen that second stage heating relay H2R is effectively "locked-in" by its own contacts H2R1 even though contacts TH2 may open in response to satisfaction of the relatively high demand for heat. Thus, relay H2R will remain energized via contacts H1R2 and H2R1 until such time as the relatively low demand for heat is satisfied and contacts TH1 are caused to open, producing the second signal and resulting in de-energization of first stage heating relay H1R and opening of contacts H1R2.

It may thus be seen that the control circuit as illustrated in FIG. 2 provides for continuous operation of first heat transfer means 9 in response to a relatively high demand for heat until such time as both the relatively high demand and relatively low demand are satisfied, without re-energization of the heat pump after satisfaction of the relatively high demand.

Assuming now that the outdoor ambient temperature drops to such a level that it is undesirable to operate the heat pump, contacts ODT2 will close to produce an override signal resulting in energization of relay ODTR. Fourth means including normally closed contacts ODTR1 which open upon energization of relay ODTR prevent energization of first stage heating relay H1R, thereby preventing operation of heat pump 14. Under these conditions, it is desirable that the first heat transfer means 9 be operated in response to a relatively low demand for heat in order to maintain the desired temperature within indoor space 2. This function is carried out through operation of fifth means responsive to said override signal including normally open contacts ODTR2 which close to place first stage heating contacts TH1 in series with second stage heating relay H2R. Therefore, upon closure of contacts TH1 in response to a relatively low demand for heat, the said first signal generated thereby will energize relay H2R in order to initiate operation of first heat transfer means 9, subject to termination in response to the said second signal upon opening of contacts TH1, as described above. It may be noted that a third set of contacts ODTR3 is provided in order to isolate contacts TH2 during this mode of operation although it will be appreciated that this set of contacts is not absolutely necessary since contacts TH2 will always open before contacts TH1.

As is known to those skilled in the art, operation of a heat pump under certain conditions may result in the buildup of frost on outdoor heat exchange coil 17, and means must be provided for the periodic removal thereof. This is accommodated in the present control circuit through provision of a conventional defrost switch DFS which may be of manual, demand, or timer type, and which, upon closure, energizes defrost relay DFR. Defrost relay DFR includes normally open contacts DFR1 which close in order to maintain energization of heating relay H1R until such time as the defrost cycle is complete, even though first stage heating contacts TH1 may open. Normally closed contacts DFR3 are opened in order to place reversing valve 20 in its defrost (cooling) position such that hot refrigerant gas is discharged into outdoor coil 17 in order to melt the frost thereon and normally closed contacts DFR5 open in order to prevent operation of outdoor fan 24 during defrost.

In order to maintain a supply of heat to indoor space 2 during defrost, normally open contacts DFR4 are closed in order to energize fuel solenoid FS by way of contacts PLT1. As described above, contacts PLT1 are adjusted so as to be closed until such time as the temperature of the air immediately upstream from indoor coil 16 reaches about 135° F. and to reclose at such time as said temperature drops to about 95° F. Thus, first heat transfer means 9 will be cycled on and off during defrost in order to maintain a supply of heat to indoor space 2 while preventing objectionably high air temperatures passing over indoor heat exchange coil 16. It may further be noted that a normally closed set of contacts DFR2 is provided in series with second stage heating relay H2R in order to prevent energization thereof during a defrost cycle. Similarly, normally closed contacts H2R2 are provided in series with defrost relay DFR in order to prevent energization thereof when first heat transfer means 9 is operating in response to energization of H2R.

It is believed that operation of the heat pump in its cooling mode will now be apparent. Upon sensing a demand for cooling within indoor space 2, contacts TC will close to produce a fourth signal. Third means are provided which respond to said fourth signal in order to initiate operation of heat pump 14 in its cooling mode and include cooling relay CR which is energized upon closure of contacts TC to initiate operation of the indoor fan means, outdoor fan, and compressor as described above. Since reversing valve solenoid RVS will not be energized, reversing valve 20 will assume its cooling position as illustrated in dotted lines in FIG. 1. Upon satisfaction of the demand for cooling, contacts TC will reopen to produce a fifth signal terminating operation of the heat pump in its cooling mode.

In the event that the outdoor ambient temperature is above the balance point, such that contacts ODT1 are open, operation of first heat transfer means 9 is prevented irrespective of closure of second stage heating contacts TH2 and heat pump 14 will operate exclusively in order to satisfy any demand for heat.

In practice, contacts TC, TH1, and TH2 will be incorporated in a single thermostat, typically mounted on a wall of indoor space 2, as diagrammatically illustrated at 25. Similarly, contacts ODT1 and ODT2 of temperature sensing means 26 would be disposed at a location on the outdoor unit of heat pump 14 in a position to accurately sense outdoor ambient temperature. Contacts PLT1 and PLT2 of temperature sensing means 27 are disposed within housing 8 or duct means 12a, b at a position immediately upstream from indoor heat exchange coil 16 in order to accurately sense the temperature of air being circulated thereover. The signals from temperature sensing means 25, 26, and 27 are conveyed to a master control unit 28 which may contain the remaining control components illustrated in FIG. 2 and which may be mounted at any convenient location with respect to the apparatus.

Although the control circuit as disclosed and illustrated in FIG. 2 embodies electromechanical components, it will be appreciated by those skilled in the art that more sophisticated solid-state-type components may be substituted therefor in the form of hard wired logic or a programmed microprocessor in order to carry out the same functions with respect to operation of the air conditioning apparatus.

While the invention has been described with respect to a preferred embodiment, it is to be understood that modifications thereto will be apparent to those skilled in the art within the scope of the invention, as defined in the claims which follow.

We claim:

1. Apparatus for conditioning the air within an indoor space comprising:
   a. a housing including first heat transfer means for selectively heating air passing therethrough;
   b. duct means connected to said housing for providing communication between said housing and said indoor space;
   c. indoor fan means for circulating air through said housing and said duct means to said indoor space;
   d. a heat pump selectively operable in at least a heating mode including a compressor, indoor heat exchange coil, expansion means, outdoor heat exchange coil, and conduit means for connecting same in a closed refrigerant circuit whereby said indoor heat exchange coil may operate as a condenser to remove heat from compressed refrigerant and said outdoor heat exchange coil may operate as an evaporator to transfer heat to expanded refrigerant, said indoor heat exchange coil being disposed within one of said housing and said duct means in heat exchange relationship with said circulated air and said outdoor heat exchange coil being disposed in heat exchange relationship with an ambient heat sink; and
   e. control means for selectively operating said first heat transfer means and said heat pump comprising
      i. means for sensing the demand for heat within said indoor space and for producing a first signal in response to a demand for heat and a second signal in response to satisfaction of said demand for heat;
      ii. means for sensing the temperature of said ambient heat sink and for producing an override signal when said ambient temperature drops below a predetermined value;
      iii. first means for initiating operation of said heat pump in said heating mode in response to said first signal and terminating operation thereof in response to said second signal;
      iv. fourth means responsive to said override signal for preventing operation of said heat pump in said heating mode in response to said first signal; and
      v. fifth means responsive to said override signal for effecting operation of said first heat transfer means in response to said first signal and terminating operation thereof in response to said second signal.

2. Apparatus for conditioning the air within an indoor space comprising:
   a. a housing including first heat transfer means for selectively heating air passing therethrough;
   b. duct means connected to said housing for providing communication between said housing and said indoor space;
   c. indoor fan means for circulating air through said housing and said duct means to said indoor space;
   d. a heat pump selectively operable in at least a heating mode including a compressor, indoor heat exchange coil, expansion means, outdoor heat exchange coil, and conduit means for connecting same in a closed refrigerant circuit whereby said indoor heat exchange coil may operate as a condenser to remove heat from compressed refrigerant and said outdoor heat exchange coil may operate as an evaporator to transfer heat to expanded refrigerant, said indoor heat exchange coil being disposed within one of said housing and said duct means at a location downstream from said first heat transfer means in heat exchange relationship with said circulated air and said outdoor heat exchange coil being disposed in heat exchange relationship with an ambient heat sink; and
   e. control means for selectively operating said first heat transfer means and said heat pump comprising
      i. means for sensing the demand for heat within said indoor space and for producing a first signal in response to a relatively low demand for heat and a second signal in response to satisfaction of said relatively low demand for heat, and for producing a third signal in response to a relatively high demand for heat;
      ii. first means for initiating operation of said heat pump in said heating mode in response to said first signal and terminating operation thereof in response to said second signal;
      iii. second means for initiating operation of said first heat transfer means and terminating operation of said heat pump in response to said third signal, and for terminating operation of said first heat transfer means in response to said second signal;
      iv. means for sensing the temperature of said ambient heat sink and for producing an override signal when said ambient temperature drops below a predetermined level;
      v. fourth means responsive to said override signal for preventing operation of said heat pump in response to said first signal; and
      vi. fifth means responsive to said override signal for effecting operation of said first heat transfer means in response to said first signal and terminating operation thereof in response to said second signal.

* * * * *